United States Patent
Hoffmann et al.

(10) Patent No.: US 8,932,693 B2
(45) Date of Patent: Jan. 13, 2015

(54) POLYAMIDE BLEND MOLDING COMPOUND

(75) Inventors: Botho Hoffmann, Domat/Ems (CH); Ralph Kettl, Paspels (CH)

(73) Assignee: EMS-Patent AG, Domat/Ems (CH)

( * ) Notice: Subject to any disclaimer, the term of this patent is extended or adjusted under 35 U.S.C. 154(b) by 423 days.

(21) Appl. No.: 12/845,797

(22) Filed: Jul. 29, 2010

(65) Prior Publication Data
US 2011/0023986 A1 Feb. 3, 2011

Related U.S. Application Data

(60) Provisional application No. 61/239,590, filed on Sep. 3, 2009.

(30) Foreign Application Priority Data

Jul. 31, 2009 (EP) .................................... 09167002
Jun. 4, 2010 (EP) .................................... 10165021

(51) Int. Cl.
*B32B 1/08* (2006.01)
*C08L 77/06* (2006.01)
(Continued)

(52) U.S. Cl.
CPC .................. *C08L 77/06* (2013.01); *C08L 77/02* (2013.01); *F16L 9/127* (2013.01); *C08L 23/20* (2013.01); *C08L 2205/02* (2013.01); *C08L 2205/035* (2013.01)
USPC ........ 428/36.9; 428/34.1; 428/34.2; 428/35.7; 428/35.9

(58) Field of Classification Search
USPC ...................... 428/34.1, 34.2, 35.7, 35.9, 36.9
See application file for complete search history.

(56) References Cited

U.S. PATENT DOCUMENTS

| 5,928,738 A | 7/1999 | Auf Der Heide et al. ... 428/34.9 |
| 6,203,750 B1 * | 3/2001 | Ahlgren et al. ............... 264/514 |

(Continued)

FOREIGN PATENT DOCUMENTS

| CN | 1332805 | 8/2007 |
| DE | 103 33 005 | 2/2005 |

(Continued)

OTHER PUBLICATIONS

U.S. Appl. No. 12/817,823 to Sturzel et al., entitled "Photovoltaic Module Mono-Backsheet, Method for the Production Thereof, and the Use Thereof in the Production of Photovoltaic Modules," filed Jun. 17, 2010.

(Continued)

*Primary Examiner* — Marc Patterson
(74) *Attorney, Agent, or Firm* — Greenblum & Bernstein, P.L.C.

(57) ABSTRACT

Polyamide blend molding compound, includes a polyamide blend content and at least one impact-resistant component, characterized in that the polyamide blend content includes the following polyamides: (A) 20 to 65% by weight of at least one semi-crystalline polyamide with an enthalpy of fusion >40 J/g and with an average of at least 8 C atoms per monomeric unit; (B) 8 to 25% by weight of at least one amorphous and/or microcrystalline polyamide, with the microcrystalline polyamide having an enthalpy of fusion in the range of 4 to 40 J/g, and (C) 1 to 20% by weight of at least one polyamide with an average of a maximum of 6 C atoms per monomeric unit. The impact-resistant component includes as follows: (D) 10 to 40% by weight of a polyamide elastomer which is composed of hard segments and soft segments, with the hard segments being based on lactams and/or amino-carboxylic acids, and (E) 0 to 35% by weight of a non-polyamide elastomer.

28 Claims, 1 Drawing Sheet

(51) Int. Cl.
  *C08L 77/02* (2006.01)
  *F16L 9/127* (2006.01)
  *B32B 1/02* (2006.01)
  *C08L 23/20* (2006.01)

(56) References Cited

U.S. PATENT DOCUMENTS

| | | |
|---|---|---|
| 6,416,832 B1 | 7/2002 | Uehara et al. .............. 428/34.8 |
| 7,582,342 B2 | 9/2009 | Baumann et al. ........... 428/35.7 |
| 2002/0173596 A1 | 11/2002 | Montanari et al. ........... 525/432 |
| 2002/0179888 A1 | 12/2002 | Montanari et al. ........... 252/500 |
| 2004/0191440 A1* | 9/2004 | Funaki et al. ............... 428/34.6 |
| 2004/0259996 A1 | 12/2004 | Stoeppelmann et al. .... 524/430 |
| 2005/0009976 A1 | 1/2005 | Akkapeddi et al. ........... 524/445 |
| 2007/0089798 A1 | 4/2007 | Matsuo et al. ............... 138/118 |
| 2010/0159175 A1 | 6/2010 | Stoeppelmann et al. .... 428/36.9 |

FOREIGN PATENT DOCUMENTS

| | | |
|---|---|---|
| DE | 102004054390 A1 | 5/2006 |
| EP | 1 329 481 | 7/2003 |
| EP | 1 416 010 | 5/2004 |
| EP | 1470910 | 10/2004 |
| EP | 1 884 356 A1 | 2/2008 |
| EP | 1 942 296 | 7/2008 |
| EP | 1942296 A1 * | 7/2008 |
| JP | 2001-329165 | 11/2001 |
| JP | 2002-275371 | 9/2002 |
| JP | 2002-284992 | 10/2002 |
| WO | 2005/033185 | 4/2005 |
| WO | 2007/087896 | 8/2007 |

OTHER PUBLICATIONS

Xanthos et al. "Impact Modification of Aromatic/Aliphatic Polyamid Blends: Effects of Composition and Processing Conditions" *Journal of Applied Polymer Science,* vol. 62, 1167-1177, 1996.
China Office action, dated Oct. 18, 2013, along with an English translation thereof.
Japan Office action, dated Dec. 3, 2013 (English translation).
Walter Caseri, "PEBA", Apr. 2007, XP055079548, Gefunden im Internet: URL:http://www.roempp.com, Sep. 17, 2013.
E.P.O. Office action, mail date is Sep. 23, 2013 w/ English language translation.

* cited by examiner

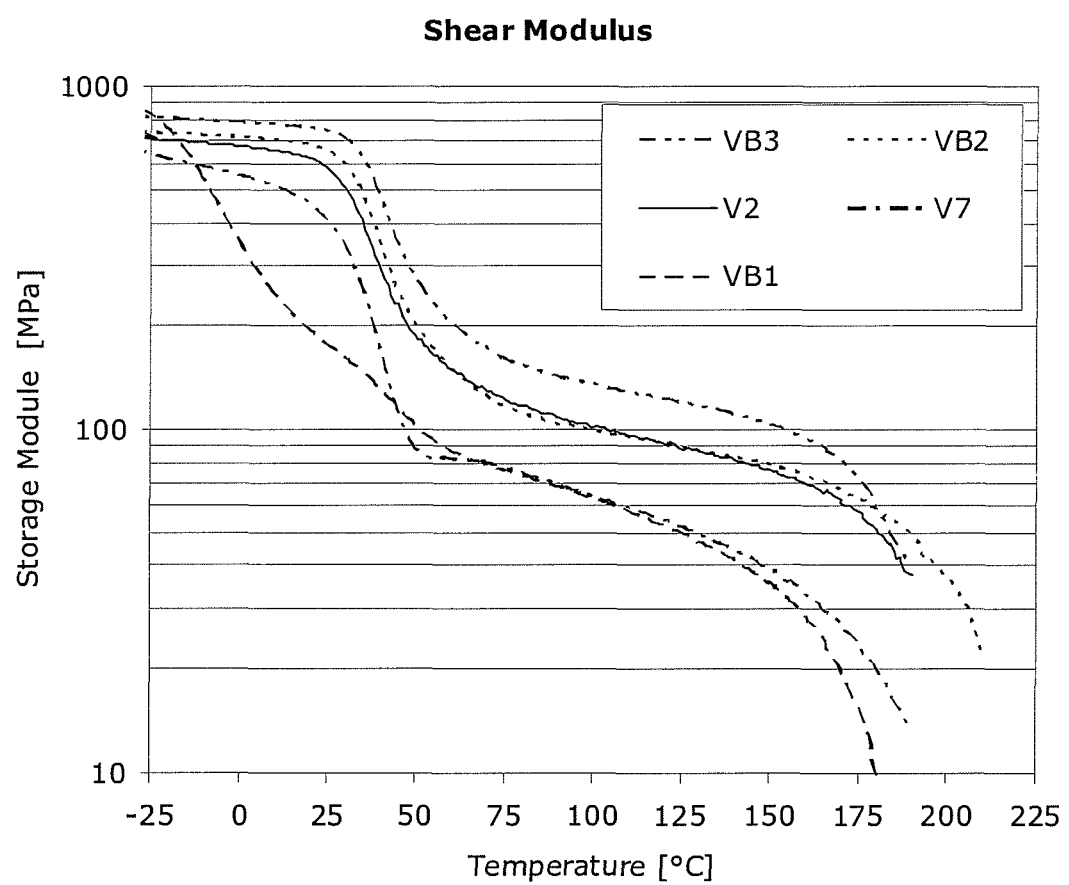

POLYAMIDE BLEND MOLDING COMPOUND

CROSS REFERENCE TO RELATED APPLICATIONS

This application claims priority of the European patent application No. 09 167 002.6 of Jul. 31, 2009, and of the European patent application No. 10 165 021.6 of Jun. 4, 2010. This application also claims the benefit of U.S. provisional application No. 61/239,590 of Sep. 3, 2009. The disclosure of all these applications are incorporated herein by explicit reference for all intents and purposes.

BACKGROUND OF THE INVENTION

1. Field of the Invention

The invention relates to a polyamide blend molding compound with a polyamide blend content and at least one impact-resistant component according to the preamble of the independent claims 1 and 2. Such molding compounds are suitable, among other things, for the production of lines in industrial and automotive applications, preferably for vacuum lines and especially preferably for brake booster lines.

2. Discussion of Background Information

Plastic tubes made of polyamide are known and are used in many ways in vehicle construction for brake, hydraulic, fuel, cooling and pneumatic lines for example (cf. DIN 73378: "Polyamide tubing for motor vehicles"). Polyamide blend molding compounds with a polyamide blend content and an impact-resistant component are known from the patent application EP 1 942 296 A1 with respect to the production of hydraulic lines, especially clutch lines.

Plastic tubes or lines used in vehicle construction must meet a large number of requirements. In the case of a brake booster line, its function can be described as follows:

A brake booster is used on the brake of a vehicle to reduce the actuating force necessary for reaching a desired braking effect. This is especially necessary when disk brakes are used, because the actuation of the disk brakes of a car with the pedal pressure alone would require too much effort. In the case of vacuum brake boosters which are mostly installed in passenger cars and light commercial vehicles, the auxiliary force is generated by means of a pressure difference (atmospheric pressure to negative pressure). In the case of medium to heavy commercial vehicles (usually from 7.49 t) such as trucks for example the braking force is generated by means of compressed air, i.e. by means of a pneumatic power brake system. The operating pressure in this case is approx. 8 bar. In addition to this pneumatic brake booster, there are also hydraulic and electric ones.

Motor vehicles with classic gasoline engines require the use of a throttle under partial load in order to produce a combustible fuel/air mixture. A negative pressure is produced behind the throttle in the intake cycle (intake manifold) as a side effect. The brake pedal pressure is amplified in pneumatic brake boosters with the help of the intake vacuum or a vacuum pump. In the case of current gasoline engines with direct gasoline injection such as in the case of the VW TSI, a separate suction pump or vacuum pump is required due to the system-induced omission of the throttle, as is also the case in diesel engines (which principally also do not have a throttle). A non-return valve is installed in the connecting line between the brake booster and the vacuum source which is used for maintaining the vacuum under full load and engine at standstill. This vacuum represents a pressure gradient in relation to the outside air which can be utilized in the brake booster for increasing the braking force.

The vacuum or negative pressure is usually brought by means of tubing from the vacuum generator to the brakes or brake booster (BB). In order to ensure that it offers perfect functioning under all possible weather and temperature conditions, the following requirements, among other things, must be fulfilled by the brake booster line:

1) Material requirements on flexible lines "TL 52655", brake booster lines (VOLKSWAGEN AG): Normal temperature range (continuous temperature $T_D \leq 120°$ C.); high temperature range (continuous temperature $T_D \leq 160°$ C.), sufficient strength up to at least +150° C. (over +160° C. in the short run). On the other hand, brake booster lines must also work securely even at temperatures of −40° C. It is also demanded that such brake booster lines are resistant against ozone and survive repeated change in climate without crack formation (with up to 20-60 cycles).

2) Worldwide Engineering Standards for Low Pressure Pipe Assembly for Brake Boosters "GMW 14640" (GENERAL MOTORS): Type A normal temperature range −40° C. to +110° C. (peak temperature up to +120° C.); type B high temperature range −40° C. to +140° C. (peak temperature up to +150° C.). This applies to line diameters 9±0.15×1.5±0.1 mm; 12±0.15×1.5±0.1 mm; 12.5±0.15×1.5±0.1 mm.

3) Delivery specs for tubes made of polyamide (PA) for the low-pressure range "DBL 6270": (MERCEDES-BENZ): The pipes are subjected to heat ageing over 1000 hours at storage temperatures of up to +150° C. and then tested for impact resistance according to ISO 179 at 23° C. and −40° C. In the new state of the tubes, the impact resistance test occurs at 23° C., −40° C. and −50° C. The burst pressure test is performed according to DIN 53 758. Marking according to DIN 73 378 and FMVSS106/74 occurs for brake booster lines. DIN 74 324-1 and DIN 74 324-2 apply additionally to pneumatic brake systems. The product specification A116 000 66 99 and the norm FMVSS 106 apply additionally to tubes as vacuum lines for the operation of brake boosters (with the exception of Uni-mog).

The documents EP 1 329 481 A2 and DE 103 33 005 A1 are also known from the state of the art. Both deal with lines for vehicle construction, machine and apparatus construction, and medical engineering. In particular, these documents deal with the production of vacuum lines for brake boosters, ventilation lines, pressure hoses, pneumatic lines, control lines, coolant lines, fuel lines, vent lines, lines for windscreen washer systems, lines for hydraulic clutch systems, power steering lines, air-conditioning lines, cable or lead sheathings, or with injection-molded parts of an oil filter or fuel filter. EP 1 329 481 A2 discloses a molding compound which contains 99.9 to 95% by weight of a polyether amide on the basis of a linear aliphatic diamine with 6 to 12 C atoms, a linear aliphatic or aromatic dicarboxylic acid with 6 to 12 C atoms, and a polyetherdiamine with at least 3 C atoms per ether oxygen and primary amino groups at the ends of the chains. This molding compound is complemented at 100% by weight by 0.1 to 5% by weight of a co-polymer made of different chemical components.

DE 103 33 005 A1 discloses a molding compound which contains 97 to 80% by weight of a polyether amide on the basis of a linear aliphatic diamine with 6 to 14 C atoms, a linear aliphatic or aromatic dicarboxylic acid with 6 to 14 C atoms, and a polyetherdiamine with at least 3 C atoms per ether oxygen and primary amino groups at the ends of the chains. This molding compound is complemented at 100% by weight by 3 to 20% by weight of a caoutchouc containing functional grnups.

The product VESTAMID® EX9350 block is further known from the state of the art (VESTAMID® is a registered trademark of EVONIK DEGUSSA GmbH). It concerns a heatproof and weatherproof impact-modified polyamide 612 elastomer for extrusion processing during the production of tubing for example such as those for brake booster lines.

Blends of aromatic/aliphatic polyamides with different compositions are known from M. Xanthos et al. 1996 "Impact Modification of Aromatic/Aliphatic Polyamide Blends: Effects of Composition and Processing Conditions" (Journal of Applied Polymer Science, Vol. 62: 1167-1177). A polyamide blend molding compound is disclosed, having a polyamide content and at least one impact-resistant component, with said polyamide blend molding compound having the following composition:
- 32% by weight of an amorphous polyamide (PA 6I/6T) with an average of 7 C atoms per monomeric unit;
- 48% by weight of a polyamide (Nylon 6) on the basis of lactam and/or amino-carboxylic acid and with an average of 6 C atoms per monomeric unit, and
- 20% by weight of an ethylene/propylene elastomer (EPX) functionalized with maleic anhydride.

Document U.S. Pat. No. 5,928,738 discloses a polyamide blend molding compound with a polyamide blend content and at least one impact-resistant component, with the polyamide blend molding compound comprising the following components:
- 30% by weight of a polyamide 6/12 (Grilon CF62) with an average of 9 C atoms per monomeric unit;
- 10% by weight of an amorphous polyamide 6I/6T;
- 50% by weight of a polyamide 6 on the basis of lactam and/or amino-carboxylic acid and with an average of 6 C atoms per monomeric unit, and
- 10% by weight of ethylene/methacrylic acid elastomer.

Document U.S. Pat. No. 6,416,832 discloses a polyamide blend molding compound with a polyamide blend content and at least one impact-resistant component, with the polyamide blend molding compound comprising the following components:
- 20% by weight of a polyamide 6/12/MXD6 with an average of 8 C atoms per monomeric unit;
- 10% by weight of an amorphous polyamide;
- 50% by weight of a polyamide 6 on the basis of lactam and/or amino-carboxylic acid and with an average of 6 C atoms per monomeric unit, and
- 20% by weight of elastomers on the basis of polyethylene (AAE and PE).

Document US 2005/0009976 A1 discloses a polyamide blend molding compound with a polyamide blend content and at least one impact-resistant component, with the polyamide blend molding compound comprising the following components:
- 45% by weight of a polyamide MXD6 with an average of 7 C atoms per monomeric unit;
- 25% by weight of an amorphous polyamide, and
- 30% by weight of a polyamide (PA6-NC2) on the basis of lactam and/or amino-carboxylic acid and with an average of 6 C atoms per monomeric unit.

Document US 2007/0089798 A1 discloses a polyamide blend molding compound with a polyamide blend content and at least one impact-resistant component, with the polyamide blend molding compound comprising the following components:
- 50% by weight of a polyamide poly-meta-xylylene adipamide (MXD6) with an average of 7 C atoms per monomeric unit; and
- 50% by weight of a denatured polyamide 6 with an average of 6 C atoms per monomeric unit with a modulus of elasticity of 830 MPa.

Document US 2004/0259996 A1 discloses the production of a polyamide blend molding compound with a polyamide content and at least one impact-resistant component, with the polyamide blend molding compound comprising polyamides and polyesteramides, nano-scale and fibrous fillers and impact-resistance modifiers. Ethylene propylene rubbers (EPM) and ethylene propylene diene rubbers (EPDM) are disclosed as impact-resistance modifiers.

Document JP 2001-329165 A discloses a reinforced polyamide composition with excellent flowability during injection molding with short cycle time. The reinforced polyamide composition leads to strong hot-glued or solvent-welded products and comprises 96 to 99% by weight of a crystalline polyamide, 0.1 to 4% by weight of a partially amorphous co-polyamide with at least two aromatic monomer components, and 5 to 200 parts by weight of an inorganic filler per 100 parts by weight of a polyamide resin.

Document EP 1 942 296 A1 discloses a molding compound on the basis of polyamide which is based on a mixture of the following components:
- 45 to 97% by weight of a polyamide 610 with an average of 8 C atoms per monomeric unit;
- 0 to 30% by weight of an amorphous and/or microcrystalline polyamide and/or co-polyamide;
- 2 to 20% by weight of an impact-resistant component in the form of a co-polymer on the basis of ethylene and/or propylene, and
- 1 to 10% by weight of additives.

SUMMARY OF THE INVENTION

It is an object of the present invention to provide an alternative polyamide blend molding compound with a polyamide blend content and an impact-resistance component, with which tubes can be produced that supply at least comparable measured values as the tubes produced from molding compounds known from the state of the art. Since high flexibility is required for the preferred applications, the new molding compounds should have a modulus of elasticity which should be smaller than 1500 MPa, if possible.

This object is achieved in accordance with a first variant of the present invention by a polyamide blend molding compound according to claim 1. This polyamide blend molding compound in accordance with the invention comprises a polyamide blend content and at least one impact-resistant component and is characterized in that the polyamide blend content comprises the following polyamides:
(A) 20 to 65% by weight of at least one semi-crystalline polyamide with an enthalpy of fusion >40 J/g and with an average of at least 8 C atoms per monomeric unit;
(B) 8 to 25% by weight of at least one amorphous and/or microcrystalline polyamide, with the micro-crystalline polyamide having an enthalpy of fusion in the range of 4 to 40 J/g, especially in the range of 4 to 25 J/g, and
(C) 1 to 20% by weight of at least one polyamide with an average of a maximum of 6 C atoms per monomeric unit, and preferably with an enthalpy of fusion >40 J/g.

This polyamide blend molding compound according to the first variant is further characterized in that the impact-resistant component comprises as follows:

(D) 10 to 40% by weight of a polyamide elastomer such as polyether amides and/or polyester ether amides and/or polyester amides, which is made up of hard segments and soft segments, with the hard segments being based on lactams and/or amino-carboxylic acids and the soft segment preferably on polyether and/or polyester, and (E) 0 to 35% by weight of a non-polyamide elastomer.

This object is achieved according to a second variant of the present invention by a polyamide blend molding compound according to claim 2. This polyamide blend molding compound in accordance with the invention comprises a polyamide blend content and at least one impact-resistant component and is characterized in that the polyamide blend content comprises the following polyamides:

(A) 50 to 85% by weight of at least one semi-crystalline polyamide with an enthalpy of fusion >40 J/g and with an average of at least 8 C atoms per monomeric unit;

(B) 2 to 15% by weight of at least one amorphous and/or microcrystalline polyamide, with the micro-crystalline polyamide having an enthalpy of fusion in the range of 4 to 40 J/g, especially in the range of 4 to 25 J/g, and (C) 2 to 15% by weight of at least one polyamide with an average of a maximum of 6 C atoms per monomeric unit, and preferably with an enthalpy of fusion >40 J/g.

This polyamide blend molding compound according to the second variant is further characterized in that the impact-resistant component comprises:

(D) 1 to 20% by weight of a polyamide elastomer such as polyether amides and/or polyester ether amides and/or polyester amides, which is made up of hard segments and soft segments, with the hard segments being based on lactams and/or amino-carboxylic acids and the soft segment preferably on polyether and/or polyester, and (E) 0 to 35% by weight of a non-polyamide elastomer.

Semi-crystalline polyamides with an average of a maximum of 6 C atoms per monomeric unit are preferably chosen for the component (C) in both variants in accordance with the invention. In addition, polyamide elastomers of the component (D) are preferably chosen from the group of polyether amides, polyester ether amides and/or polyester amides.

All details for both variants in accordance with the invention in percent by weight relate to the total weight of the polyamide blend molding compound and are obtained at 100% by weight, optionally complemented by conventional additives that are also added.

Further features and preferred embodiments in accordance with the invention are obtained from the dependent claims.

The following definitions are mentioned in connection with the present invention:

The term "polyamide" shall be understood as follows:
Homopolyamides and
Copolyamides.

The term "polyamide blends" shall be understood as follows:
Mixtures (blends) of homopolyamides and copolyamides;
Mixtures of homopolyamides, and
Mixtures of copolyamides.

The term "polyamide blend molding compound" shall be understood to be a molding compound which contains polyamides and/or polyamide blends. This polyamide blend molding compound can contain additives.

The term "structural unit" designates the smallest unit of a polyamide repeating in the chain which is composed of the amino-carboxylic acid and/or the diamine and the dicarboxylic acid. The term "repeating unit" is synonymous to the term "structural unit".

Chosen examples of such structural units are shown in Table 1.

TABLE 1

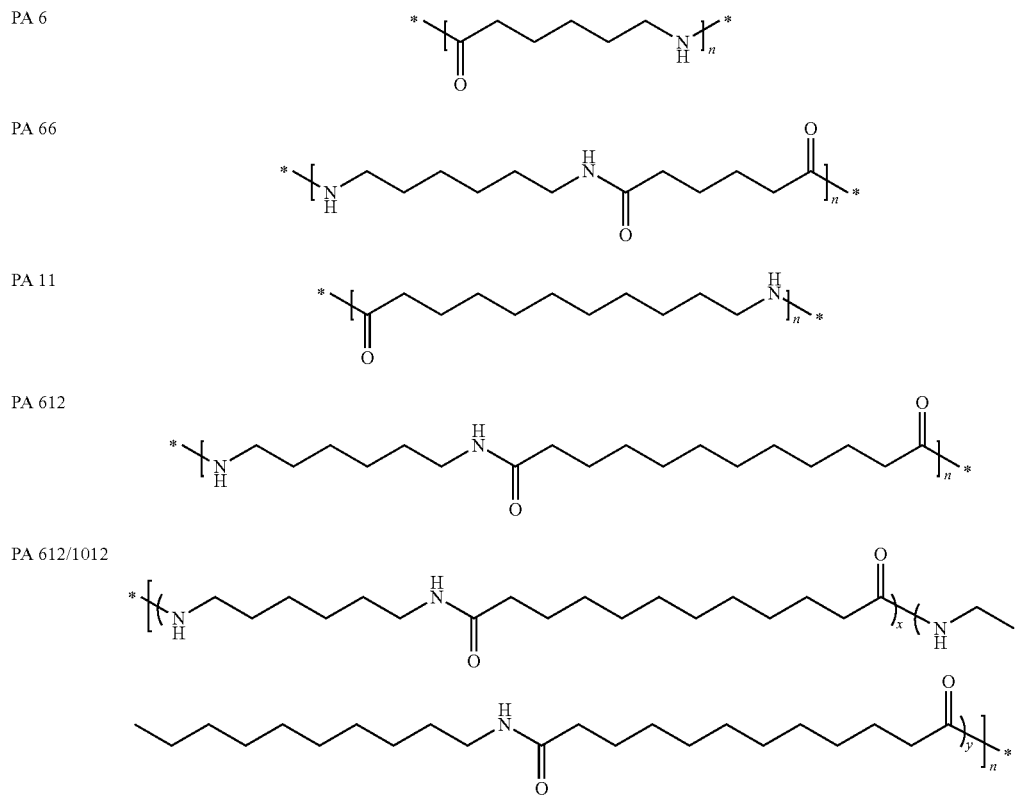

In Table 1, the structural unit is placed in square brackets for each of these polyamides and is provided with the index n. As is shown, the structural unit of a polyamide of the so-called AA/BB type (e.g. PA 66 or PA 612) comprises more than one monomeric unit, namely mutually complementary diamine and dicarboxylic monomeric units.

The term "average (Ø) number of C atoms per monomeric unit" is understood to be the number of C atoms which is calculated from the sum total of the number of C atoms in the used monomers divided by the number of the used monomers, as for example:

| | |
|---|---|
| PA 6 | Ø 6 C atoms per monomeric unit [6:1 = 6] |
| PA 66 | Ø 6 C atoms per monomeric unit [(6 + 6):2 = 6] |
| PA 11 | Ø 11 C atoms per monomeric unit [11:1 = 11] |
| PA 612 | Ø 9 C atoms per monomeric unit [(6 + 12):2 = 9] |
| PA 612/1012 | Ø 10 C atoms per monomeric unit [{(6 + 12) + (10 + 12)}:4 = 10] |

The average (Ø) number of C atoms per monomeric unit can also be a non-integral number.

It is further defined that polyamides are made up on the basis of linear and/or branched aliphatic and/or cycloaliphatic monomers, chosen from the group of diamines, dicarboxylic acids, lactams and amino carboxylic acids. Diamines, dicarboxylic acids, lactams and amino carboxylic acids are the four possible types of monomers which are found in the respective monomeric units in the polyamides based on the same. It is distinguished between the following:

Polyamides with an average of at least 8 C atoms per monomeric unit such as PA 11, PA 12, PA 412, PA 414, PA 418, PA 46/418, PA 610, PA 612, PA 614, PA 618, PA 106, and PA 106/10T;

Amorphous and/or microcrystalline polyamides, with the microcrystalline polyamide having an enthalpy of fusion in the range of 4 to 40 J/g, especially in the range of 4 to 25 J/g such as PA MACMI/MACMT/12, PA MACMI/12 and PA PACM12, and Polyamides with an average of a maximum of 6 C atoms per monomeric unit such as PA 6, PA 46 and PA 66.

The monomers for producing the polyamides can be chosen as follows: Dicarboxylic acids can be chosen from the following group: aliphatic $C_4$-$C_{44}$ diacid, cycloaliphatic $C_8$-$C_{36}$ diacid, aromatic diacid (preferably TPS, IPS, NDS), and mixtures and combinations thereof. Preferred dicarboxylic acids are chosen from the group of adipic acid, sebacic acid, dodecanedioic acid, terephthalic acid, isophthalic acid, cyclohexane dicarboxylic acid, and mixtures thereof, especially preferably succinic acid, glutaric acid, adipic acid, pimelic acid, suberic acid, azelaic acid, sebacic acid, undecanedioic acid, dodecanedioic acid, brassylic acid, tetradecanedioic acid, pentadecanedioic acid, hexadecanedioic acid, heptadecanedioic acid, octadecanedioic acid, nonadecanedioic acid, eicosanedioic acid, japanic acid, cyclohexanedicarboxylic acid, especially cis- and/or trans-1,4-cyclohexane dicarboxylic acid and/or cis- and/or trans-cyclohexane 1,3-dicarboxylic acid (CHDA), dimeric fatty acid having 36 or 44 C atoms, isophthalic acid, terephthalic acid, naphthaline dicarboxylic acid.

Diamines are preferably chosen from the group of branched or unbranched aliphatic $C_4$-$C_{18}$ diamines, cycloaliphatic $C_6$-$C_{20}$ diamines, diamines with an aromatic core, and mixtures and combinations thereof. Examples for linear or branched aliphatic diamines are 1,4-butane diamine, 1,5-pentane diamine, 2-methyl-1,5-pentane diamine (MPMD), 1,6-hexane diamine, 1,7-heptane diamine, 1,8-octane diamine (OMDA), 1,9-nonane diamine (NMDA), 1,10-decane diamine, 2-methyl-1,8-octane diamine (MODA), 2,2,4-trimethyl hexamethylene diamine (NDT), 2,4,4-trimethyl hexamethylene diamine (INDT), 5-methyl-1,9-nonane diamine, 1,11-undecane diamine, 2-butyl-2-ethyl-1,5-pentane diamine, 1,12-dodecane diamine, 1,13-tridecane diamine, 1,14-tetradecane diamine, 1,16-hexadecane diamine, trimethyl hexamethylene diamine-terephthalate (TMDT), isophorone diamine (IPD) and 1,18 octadecane diamine.

Cyclohexane diamine, 1,3-bis-(aminomethyl)-cyclohexane (BAC), isophorone diamine, norbonane diamine, norbonane dimethylamine, bis(aminomethyl)norbonane, 4,4'-diaminodicyclohexylmethane (PACM), 2,2-(4,4'-diaminodicyclohexyl)propane (PACP) and 3,3'-dimethyl-4,4'-diamino-dicyclohexylmethane (MACM) can be used as cycloaliphatic diamines. Arylaliphatic diamines to be mentioned are m-xylene diamine (MXDA) and p-xylylene diamine (PXDA). All used abbreviated designations and abbreviations correspond to ISO norm 1874-1 (cf. Table A.3: Symbols for non-linear aliphatic monomeric units).

Lactams or amino dicarboxylic acids are preferably chosen from the group consisting of caprolactam, laurinlactam, aminocaproic acid, aminolauric acid and aminoundecanoic acid. Preferred are lactams or $\alpha,\omega$-amino acids with 4, 6, 7, 8, 11 or 12 C atoms. These are the lactams pyrrolidine-2-on (4 C atoms), ε-caprolactam (6 C atoms), oenanthe lactam (7 C atoms), capryllactam (8 C atoms), laurinolactam (12 C atoms) or the $\alpha,\omega$-amino acids of 1,4-aminobutanoic acid (4 C atoms), 1,6-aminohexanoic acid (6 C atoms), 1,7-aminoheptanoic acid (7 C atoms), 1,8-aminooctanoic acid (8 C atoms), 1,11-aminoundecanoic acid (11 C atoms) and 1,12-aminododecanoic acid (12 C atoms).

The person skilled in the art is aware which types of monomers or which monomers must be used for the production of the different types of polyamides (homopolyamides of type AA/BB or of type AB, or for co-polyamides).

The present invention is not anticipated by the known state of the art:

Xanthos et al. do not mention the use of a polyamide elastomer as an impact-resistance modifier or a semi-crystalline polyamide with an average of at least 8 C atoms per monomeric unit.

U.S. Pat. No. 5,928,738, U.S. Pat. No. 6,416,832 and US 2005/0009976 A1 do not teach the use of a polyamide elastomer as an impact-resistance modifier.

US 2007/0089798 A1 does not teach the use of an amorphous and/or microcrystalline polyamide, and also not the use of a polyamide elastomer as an impact-resistance modifier. Although the modulus of elasticity of the PA 6 component is relatively low, it does not concern a polyamide elastomer within the terms of the present invention because PA 6 does not have any soft segments.

The content of nanoscale and fibrous fillers and non-polyamide elastomers as impact-resistance modifiers are of predominant interest in document US 2004/0259996 A1. The teaching that the combination of polyamides with an average of a maximum of 6 C atoms per monomeric unit with amorphous and/or microcrystalline polyamides and polyamides with an average of at least 8 C atoms per monomeric unit is not disclosed in document US 2004/0259996 A1 (and also not in the documents JP 2001-329165 A and EP 1 942 296 A1).

DETAILED DESCRIPTION OF THE INVENTION

The present invention will be explained in closer detail by reference to the enclosed drawing that is intended to illustrate but not to limit the present invention, wherein:

FIG. 1 shows a logarithmic view of the shear modulus curves on molded bodies produced with the molding compounds in accordance with the invention and comparative molding compounds.

DETAILED DESCRIPTION OF THE INVENTION

FIG. 1 shows the shear modulus curves depending on the temperature. Comparative example 1 (VB1), which is preferably used for applications such as brake booster lines, shows a very flat progression with a storage module of approx. 800 MPa at −25° C. and with a storage module that is close to 10 MPa at 180° C. The comparative examples VB2 and VB3 still show a storage module of 60 MPa at 180° C. The tests V2 and V7 in accordance with the invention show a storage modulus of at least 20 MPa at 180° C. and less than 700 MPa at −25° C.

The component A of the polyamide blend content of the polyamide blend molding compound in accordance with the invention concerns polyamides with an average of at least 8 C atoms per monomeric unit. These polyamides are composed on the basis of linear and/or branched aliphatic and/or cycloaliphatic and/or aromatic monomers, chosen from the group of diamines, dicarboxylic acid, lactams and amino carboxylic acids such as PA 11, PA 12, PA 610, PA 612, PA 1010, PA 106, PA 106/10T, PA 614, and PA 618, or mixtures thereof.

When a semi-crystalline polyamide of component A is used, it is preferable that this semi-crystalline has an enthalpy of fusion of >40 J/g.

When a microcrystalline polyamide or copolyamide, respectively, of component B is used, it is preferable that said microcrystalline polyamide and/or copolyamide has an enthalpy of fusion in the range of 4 to 40 J/g, especially in the range of 4 to 25 J/g (measured with differential scanning calorimetry, DSC). Preferably, such a microcrystalline polyamide/copolyamide concerns a polyamide which leads to transparent molded parts when processed without any further components.

Microcrystalline polyamides are composed of aliphatic, cycloaliphatic and/or aromatic monomers and comprise both homopolyamides and copolyamides. Microcrystalline polyamides are no longer completely amorphous. However, they have crystallites as a result of their microcrystalline structure which are smaller than the wavelength of light and are thus not visible. Microcrystalline polyamides are therefore still transparent for the eye.

Transparent homopolyamides such as PA MACM12 and PA PACM12 and transparent copolyamides PA 12/MACMI and PA MACM12/PACM12 and mixtures or blends of the same are especially preferred for component B. PA MACMI/MACMT/12 is especially preferable which is known from WO 2007/087896 A1.

Preferably in a polyamide blend molding compound according to the invention, the polyamide PA MACMI/MACMT/12 is formed by:
  30 to 45 parts by weight of MACMI;
  30 to 45 parts by weight of MACMT, and
  10 to 40 parts by weight of LC12.

According to a preferred embodiment, component B concerns an amorphous and/or microcrystalline polyamide and/or copolyamide on the basis of a cycloaliphatic diamine and/or a diamine with aromatic core (e.g. MXDA or PXDA). It is preferred that this polyamide is made up on the basis of cycloaliphatic diamines and aliphatic dicarboxylic acids of 10 to 18 carbon atoms. It is especially preferred that the cycloaliphatic diamine concerns MACM and/or PACM and/or IPD (isophorone diamine) with or without additional substituents. In this component B in its entirety, a copolyamide of the type MACM/PACM is especially preferred which in each case comprises aliphatic dicarboxylic acids with 10 to 18 carbon atoms such as MACM12/PACM12. In this case, a PACM concentration of more than 55 mole percent, especially more than 70 mole percent, is especially preferable. MACM stands for the ISO name bis-(4-amino-3-methyl-cyclohexyl)-methane which is commercially available under the trade name 3,3'-dimethyl-4-4'-diaminodicyclohexylmethane as Laromin® C260 Type (CAS No. 6864-37-5). The number after the term MACM stands for an aliphatic linear dicarboxylic acid (C12 e.g. DDS, dodecandioic acid), with which the diamine MACM is polymerized. PACM stands for the ISO name bis-(4-aminocyclohexyl)-methane which is commercially available under the trade name 4,4'-diaminodicyclohexylmethane as dicykan type (CAS No. 1761-71-3).

As already explained, component B can concern alternatively or additionally an amorphous polyamide and/or copolyamide, which in this case is preferably with an enthalpy of fusion of less than 4 J/g (measured with differential scanning calorimetry, DSC). Preferably, the component B has a glass transition temperature which lies above +120° C., preferably above +140° C. and more preferably above +150° C.

In a further preferred embodiment, the component B is an amorphous polyamide and/or copolyamide on the basis of aliphatic and/or cycloaliphatic diamines. Preferably, amorphous polyamides of type MACMI/12 are used, with the content of laurolactam in this case being preferably less than 35 mole percent, especially less than 20 mole percent. In each case, the I stands for isophthalic acid. Component B can therefore concern a polyamide on the basis of aromatic dicarboxylic acids with 8 to 18 carbon atoms or of aliphatic dicarboxylic acids with 6 to 36 C atoms or a mixture of such homopolyamides and/or copolyamides. However, a polyamide on the basis of lactams and/or amino carboxylic acids is preferable, with the aromatic dicarboxylic acids concerning a TPS (terephthalic acid) and/or IPS (isophthalic acid). The (transparent) homopolyamide and/or copolyamide can advantageously be a polyamide which is chosen from the group which comprises:

PA 6I/6T, PA TMDT, PA NDT/INDT, PA 6I/MACMI/MACMT, PA 6I/PACMT, PA 6I/6T/MACMI, PA MACMI/MACM36 and PA 6I; lactam-containing polyamides such as PA 12/PACMI, PA 12/MACMI, PA 12/MACMT, PA 6/6I and PA 6/IPDT, and any mixture of these polyamides. Further possible systems are: PA MACM12, PA MACM18 or PA PACM12, PA MACM12/PACM12, PA MACM18/PACM18, PA 6I/PACMI/PACMT, or mixtures formed therefrom. The name or abbreviation of the polyamides occurs according to ISO 1874-1 (cf. above in the description of the individual monomers). For example, I stands for isophthalic acid and T for terephthalic acid, TMD for trimethylhexamethylene diamine, IPD for isophorone diamine. It is further advantageous and possible that the homopolyamide and/or copolyamide concerns a polyamide on the basis of at least one dicarboxylic acid and at least one diamine with an aromatic core, preferably on the basis of MXD (meta-xylylene diamine), with the dicarboxylic acid being aromatic and/or aliphatic and with the same preferably concerning PA 6I/MXDI.

Component C of the polyamide blend content of the polyamide blend molding compound in accordance with the invention concerns polyamides with an average of a maximum of 6 C atoms per monomeric unit such as PA 6, PA 46 and PA 66. These polyamides are semi-crystalline.

Component D of the polyamide blend molding compound in accordance with the invention concerns polyamide elastomers such as polyether amides, polyester ether amides and/or polyester amides which are composed of hard segments and soft segments. The hard segments of the polyamide elastomers chosen for the present invention are based on lactams and/or amino carboxylic acids. They are based for example on aminocaproic acid, aminoundecanoic acid, aminolauric acid, caprolactam, laurolactam or mixtures thereof. Exemplary soft segments are polyoxyethylene diamine, polyoxyethylene diol, polyoxyethylene dicarboxylic acid, polyoxypropylene diamine, polyoxypropylene diol, polyoxypropylene dicarboxylic acid, polyoxytetramethylene diamine, polyoxytetramethylene diol, polyoxytetramethylene dicarboxylic acid, polycaprolactone diols, $C_{36}$-dimer-fat-diol, polyoxyalkylene diol (linear or branched $C_2$-$C_5$ alkylenes) with a number-average molar mass in the range of 200 to 3000 g/mole, with their copolymers or mixtures and copolymers with the above diols being mentioned. Especially included are polyether derivatives in the form A-X-Y-Z-B, with A, B representing independently from one another amine or alcohol residue or carboxylic acid; X, Y, Z representing independent from one another monomeric, oligomeric or polymeric units made of oxyethylene, oxypropylene or oxytetramethylene. Such polyether segments are sold by Huntsman under the name Elastamine.

As already explained, the polyamide elastomers contain polyamide (=hard segments or hard blocks) and soft segment units such as polyether and/or polyester units and are formed for example by polycondensation of the units each provided with reactive end groups. The polyamide units (polyamide segments) can be carboxyl- and/or amine-terminated, either on one terminus of segment A or on both termini. The soft segments are e.g. amine-, carboxyl- or hydroxyl-terminated, depending on the structure. The preferred soft segment units are ester or polyester and polyether units. The ester or polyester units are preferably carboxyl- or hydroxyl-terminated, whereas the polyether units preferably carry hydroxyl, carboxyl or amino terminal groups. This preferably leads to the following possibilities for linking the hard segment and the soft segment:

(1) The polyamide unit is carboxyl-terminated and the ester or polyester unit is hydroxyl-terminated. The formed copolymer is then a polyester amide.
(2) The polyamide unit is carboxyl-terminated and the soft segment is amine-terminated. The formed copolymer is then a polyether amide in the exemplary case that the soft segment is a polyether.
(3) The polyamide unit is carboxyl-terminated and the soft segment is hydroxyl-terminated. The formed copolymer is then a polyether ester amide in the exemplary case that the soft segment is a polyether.
(4) The polyamide unit is carboxyl-terminated and the soft segment is amino-terminated and a further existing soft segment is hydroxyl-terminated. The formed copolymer is then a block copolyether-ester-ether amide in the exemplary case that the soft segment is a polyether.
(5) The polyamide unit is amine-terminated and the soft segment is carboxyl-terminated. The formed copolymer is then a polyether amide in the exemplary case that the soft segment is a polyether.
(6) The polyamide unit is amine-terminated and the soft segment and a further polyester unit are carboxyl-terminated. The formed copolymer is then a polyether-ester-ester amide in the exemplary case that the soft segment is a polyether.
(7) The polyamide unit is amine-terminated and the soft segment is carboxyl-terminated. The formed copolymer is then a polyether amide in the exemplary case that the soft segment is a polyether.

The possibilities as mentioned above shall be understood merely as examples and not in a final or limiting manner in relation to the present invention.

The production of polyamide elastomers is performed at different negative pressures depending on the type of the polyamide elastomer. Special autoclaves with a strong vacuum pump are required for this purpose. EP 1 329 481 A2 and DE 103 33 005 A1 teach that a vacuum or total pressure of 28 mbar is required for the production of a polyamide elastomer. A special embodiment of the present invention is that the polyamide elastomer of the impact-resistance component is produced in a classic polymerization autoclave at a total pressure which is 300 mbar or higher.

Preferably, the polyamide blend molding compound in accordance with the invention is characterized in that the component E is an ethylene-α-olefin-copolymer, especially preferably an EPM and/or EPDM elastomer (ethylene-propylene-caoutchouc or ethylene-propylene-diene-caoutchouc). It can concern an elastomer for example which is based on an ethylene-$C_{3-12}$-α-olefin-copolymer which contains 20 to 96% by weight of ethylene and preferably 25 to 85% by weight of ethylene. Especially preferably, a $C_{3-12}$-α-olefin is chosen from the group of propene, 1-butene, 1-pentene, 1-hexene, 1-octene, 1-decene and/or 1-dodecene, with the component E especially preferably concerning ethylene-propylene-caoutchouc and/or LLDEP (Linear Low Density Polyethylene) and/or VLDPE (Very Low Density Polyethylene).

Alternatively or in addition (e.g. in mixture), the component E can concern a terpolymer on the basis of ethylene-$C_{3-12}$-α-olefin with an unconjugated diene which preferably contains 25 to 85% by weight of ethylene and an unconjugated diene up to a maximum in the range of 10% by weight. It is especially preferable that the $C_{3-12}$-α-olefin concerns an olefin chosen from the group of propene, 1-butene, 1-pentene, 1-hexene, 1-octene, 1-decene and/or 1-dodecene, and/or that the unconjugated diene is preferably chosen from the group of bicyclo(2.2.1)heptadiene, hexadiene-1.4, dicyclopentadiene and/or especially 5-ethylidene norbornene.

There is also the choice of ethylene-acrylate copolymers for component E. Further possible forms for the component E are ethylene-butylene copolymers, nitrile caoutchoucs (e.g. NBR, H-NBR), silicon caoutchoucs, EVA and micro gels that are described in WO 2005/033185 A1, or mixtures (blends) that contain such systems.

Preferably, the component E comprises acid anhydride groups which are introduced by thermal or radical reaction of the main-chain polymer with an unsaturated dicarboxylic acid anhydride, an unsaturated dicarboxylic acid or an unsaturated dicarboxylic acid monoalkylester in a concentration which is sufficient for good bonding with the polyamide. Reagents are preferably chosen for this purpose from the following group: maleic acid, maleic acid anhydride, maleic acid monobutylester, fumaric acid, aconitic acid, and/or itaconic acid anhydride. Preferably, 0.1 to 4.0% by weight of an unsaturated anhydride is grafted onto the impact-resistant component E or the unsaturated dicarboxylic acid anhydride or its precursor is grafted together with a further unsaturated monomer. Generally, the degree of grafting is preferably in a range of 0.1 to 1.0%, especially preferably in a range of 0.3 to 0.7%.

A mixture of an ethylene-propylene-copolymer and an ethylene-butylene copolymer is also possible as a preferred component E, with a maleic acid anhydride grafting degree (MAH grafting degree) in the range of 0.3 to 0.7%. Such a product can be purchased under the name "Tafmer MC201" of Mitsui Chemicals (JP).

The aforementioned possible systems for component E can also be used in mixtures. Commercially available additives such as stabilizers (e.g. UV and heat stabilizers (inorganic and organic)), softening agents, radical scavengers, nucleating agents, coadjuvants, dyes, flame retardants, fillers, functional substances, lubricants, antistatic agents (e.g. soot), reinforcing agents (e.g. glass fibers, carbon fibers, mica, glass balls) and/or pigments or combinations or mixtures thereof are admixed to the polyamide blend molding compound as required. Concerning the glass fibers, such with a round (circular) cross section and/or such with a flat (non-circular) cross section can be used.

European patent application EP 1 416 010 A2 discloses a method for example for the production of polyamide nanocomposites, according to which organically modified layered silicates can be set up to an end concentration of these layered silicates of a maximum of 10% by weight (preferably 2.5 to 6% by weight) in the melt of the polyamide nanocomposite. Exfoliated layered silicates with a mean particle size of not more than 100 nm were used as a mineral. The preferably used phyllosilicates (layered silicates) of the three-layer type (2:1) include mica (e.g. muscovite, paragonite, phologopite, biotite, lepidolite, margarite), smektites (montmorillonite, hectorite) and vermiculite. Such organically modified layered silicates can be used as a reinforcing agent in injection-molded parts and also in extruded pipes.

Preferably, the polyamide blend molding compound in accordance with the invention is used for producing molded parts, especially for extruded parts or injection-molded parts. The molded parts are preferably extruded pipes or lines which are especially preferably arranged as one-layered.

Further fillers such as glass pearls, talcum, $CaCO_3$ or kaolin particles can be mixed into injection-molded components and also extruded pipes in addition to round or flat glass fibers and/or layered silicates.

Lines in or on motor vehicles comprise as follows:
Brake booster, cooling-water, air-intake, heating, venting, hydraulic and pneumatic-brake lines. All media lines on or in a motorcar can be considered, e.g. brake booster lines, blow-by lines and vacuum control lines for turbochargers. Oil lines and lines of power steering can also be considered.

Lines in or on immobile structures include the following:
Waste-water, rainwater, pneumatic-post, heating-oil, long-distance heating, cold-water, hot-water and drinking-water lines and protective tubes for electric lines.

The following examples will illustrate the production of the polyamide blend molding compound in accordance with the invention in closer detail by way of example, but not limiting in any way.

The following chemical systems were used:
Component A=semi-crystalline polyamides with an average of at least 8 C atoms per monomeric unit;

| PA 610: | Polyamide 610 with $\eta_{rel}$ = 1.9-2.25, EMS-CHEMIE AG, Switzerland |
| PA 612: | Polyamide 612 with $\eta_{rel}$ = 2.0-2.25, EMS-CHEMIE AG, Switzerland |

Component B=amorphous and/or microcrystalline polyamide:

| PA MACMI/ MACMT/12: | Amorphous polyamide with $\eta_{rel}$ = 1.5-1.6, and with a $T_g$ = +190° C., EMS-CHEMIE AG, Switzerland |

Component C=polyamides with an average of a maximum of 6 C atoms per monomeric unit:

| PA 6: | Polyamide 6 with $\eta_{rel}$ = 3.35-3.5, EMS-CHEMIE AG, Switzerland |
| PA 66: | RADIPOL A45, Radici Chimica, Italy (polyamide 66 with $\eta_{rel}$ = 2.7) |

Impact-Resistant Component:
Component D=polyamide elastomer:

| Polyamide elastomer: | Polyether amide on the basis of PA 6 as a hard segment with $\eta_{rel}$ = 1.75-1.9, EMS-CHEMIE AG, Switzerland |

Component E=non-polyamide elastomer:

| Non-polyamide elastomer: | Tafmer MC201, Mitsui Chemicals Japan (mixture of ethylene-propylene copolymer and ethylene-butylene copolymer grafted with maleic acid anhydride). |

The production of so-called compounds or polyamide blend molding compounds occurred on a Leistritz Micro27 double-shaft extruder (d=27 mm, L/D=40, 10 housing). All components of the polyamide blend molding compound in accordance with the invention were dosed into the feeder (zone 1). The molding compounds were produced at a screw speed of 150 to 200 rpm (revolutions per minute) and cylinder temperatures in the range of +100 to +300° C. with a throughput of 12 kg per hour and granulated. The granulate was dried at +80° C. for 24 h prior to further processing.

The mixtures were then processed into the required sample bodies on an Arburg All-rounder 320-210-750 (Hydronica) injection-molding machine, with the cylinder temperatures having been +220 to +280° C. and the mold temperature between +20 and +80° C. The screw speed was 150 to 400 rpm.

The production of the test pipes in the dimension 9×1.5 mm-12.5×2.1 mm occurred on a Nokia-Maillefer pipe extrusion system, consisting of at least one extruder, pipe extrusion die, a calibration apparatus with vacuum tank and a cooling bath and subsequently a pull-off device and a cutting apparatus.

The employed polyamide molding compounds were dried for approx. 8 h at +80° C. prior to the production of the pipes. The pre-dried material is conveyed via a funnel into a 3-zone screw, molten down at cylinder temperatures of +220 to +280° C. (mass temperature: 240 to 280° C.) and homogenized, and extruded via a so-called pipe extrusion die. The still plastic preform is drawn by means of a pull-off apparatus through a calibration (e.g. sleeve calibration) where the preform is formed in the vacuum tank (total pressure 100 to 900 mbar) in the calibration. The formed pipe is then cooled for a more or less long or short period depending on the pull-off speed (the length of the cooling section is preferably 5 to 20 m). After the desired cooling or cooling section (cooling bath temperature: +10 to +20° C.), the pipe is wound or cut. The pull-off speed lies between 20 and 100 m/min. The individual compositions are compiled in the Tables 2 to 4 as well as 5 and 6.

The measurements were performed according to the following norms and on the following test objects:

| | |
|---|---|
| Tensile modulus of elasticity: | ISO 527 with a tensile speed of 1 mm/min; ISO tension bar, norm: ISO/CD 3167; type A1, 170 × 20/10 × 4 mm; temperature +23° C. |
| Tensile strength and ultimate elongation: | ISO 527 with a tensile speed of 50 mm/min; ISO tension bar, norm: ISO/CD 3167, type A1, 170 × 20/10 × 4 mm; temperature +23° C. |
| Impact resistance according to Charpy: | ISO 179/*eU; ISO test bar, norm: ISO/CD 3167, type 91, 80 × 10 × 4 mm; temperature +23° C.; *1 = non-instrumented *2 = instrumented. |
| Notched bar impact test according to Charpy: | ISO 179/*eU; ISO test bar, norm: ISO/CD 3167, type 91, 80 × 10 × 4 mm; temperature +23° C. and −30° C.; *1 = non-instrumented *2 = instrumented. |
| Glass transition temperature ($T_g$): | ISO norm 11357-11-2; granulate |
| Melt temperature ($T_m$): | ISO norm 11357-11-2; granulate |
| Enthalpy of fusion (ΔH): | ISO norm 11357-11-2; granulate |
| Bursting pressure on pipes: | DIN 73378; +23° C. |

The differential scanning calorimetry (DSC) was performed with a heat-up rate of 20 K/min.

The relative viscosity was measured according to DIN EN ISO 307, for PA 610, PA 612, amorphous PA, polyamide elastomer and compounds in 0.5% m-cresol solution (i.e. 0.5 g PA in 100 ml solution), at a temperature of +20° C.; for PA 6 in 1% by weight of solution of sulfuric acid (i.e. 1 g PA in 100 ml solution).

The melt volume rate (MVR) was measured according to ISO 1133 at +275° C.

The resistance to vacuum was determined in that a vacuum of 940 mbar was applied and the temperature was increased slowly. The temperature on the collapsed pipe is then measured.

The shear modulus curves were recorded on test objects with the dimensions 40×10×1 mm on a Physica MCR301 of the company Anton Paar with a deformation of 1.5% and a frequency of 1 Hz and a heating rate of 4 K/min.

Unless noted otherwise in the tables, the test objects were used in the dry state for the tensile test. For this purpose, the test objects were stored after the injection molding for at least 48 hours at room temperature in a dry environment. The pipes were conditioned before the test. Table 2 shows the basic data for the molding compounds of the comparative examples VB1, VB2 and VB3.

TABLE 2

| Component | Conditions | Unit | VB1 | VB2 | VB3 |
|---|---|---|---|---|---|
| VESTAMID EX9350 | | | 100 | | |
| PA 610 | | | | 93.4 | 73.4 |
| PA MACMI/MACMT/12 | | | | | 20 |
| Non-polyamide Elastomer | | | | 5 | 5 |
| Master batch for black coloring and heat stabilization | | | | 1.6 | 1.6 |
| Total | | | 100 | 100 | 100 |
| H₂O content | | % b. wt. | 0.01 | 0.01 | 0.01 |
| Melting point | | ° C. | 198 | 220 | 220 |
| Shore hardness D | | | 66 | N/D | N/D |
| Modulus of elasticity | 1 mm/min | MPa | 670 | 2340 | 2120 |
| Load at 50% elongation | 50 mm/min | MPa | 29 | N/D | N/D |
| Impact Charpy | −30° C. | kJ/m² | N/B | N/B | N/B |
| Notched bar Charpy | +23° C. | kJ/m² | 23 | 9 | 10 |
| Notched bar Charpy | −30° C. | kJ/m² | 6 | 9 | 9 |

The abbreviations mean the following: N/D = not determined, N/B = no breakage

VB1 is a polyamide 612 elastomer with a modulus of elasticity of 670 MPa and a notched bar test according to Charpy of 23 kJ/m² measured at +23° C. In comparison, VB2 and VB3 are considerably stiffer, the modulus of elasticity lies at 2340 MPa and 2120 MPa, and the notched bar test according to Charpy is lower with 9 and 10 kJ/m² at +23° C. than VB1.

Table 3 shows the basic data for the molding compounds of the tests V1, V2, V3 and V4 according to the invention.

TABLE 3

| | Component | Conditions | Unit | V1 | V2 | V3 | V4 |
|---|---|---|---|---|---|---|---|
| A | PA 610 | | | 32.2 | 20.1 | 31.2 | 31.2 |
| B | PA MACMI/MACMT12 | | | 8.1 | 15.0 | 15.0 | 15.0 |

TABLE 3-continued

| Component | | Conditions | Unit | V1 | V2 | V3 | V4 |
|---|---|---|---|---|---|---|---|
| C | PA 6 | | | | 5.0 | 7.5 | 10.0 |
| D | Polyamide elastomer | | | 39.3 | 39.3 | 27.5 | 27.5 |
| E | Non-polyamide elastomer | | | 19.3 | 19.3 | 17.5 | 15.0 |
| | Master batch for black coloring and heat stabilization | | | 1.1 | 1.3 | 1.3 | 1.3 |
| Total | | | | 100 | 100 | 100 | 100 |
| H$_2$O content | | | % b. wt. | 0.007 | 0.023 | 0.016 | 0.020 |
| Melting point | | | °C. | 220 | 219 | 220 | 221 |
| Shore hardness D | | | | N/D | N/D | 68 | N/D |
| Modulus of elasticity | | 1 mm/min | MPa | 670 | 740 | 1015 | 1130 |
| Load at 50% elongation | | 50 mm/min | MPa | 25 | 27 | 31 | 33 |
| Impact Charpy | | −30° C. | kJ/m$^2$ | N/B | N/B | N/B | N/B |
| Notched bar Charpy | | +23° C. | kJ/m$^2$ | N/B | N/B | 87 | 84 |
| Notched bar Charpy | | −30° C. | kJ/m$^2$ | 20 | 20 | 19 | 18 |

The abbreviations mean the following: N/D = not determined, N/B = no breakage

The data of the molding compounds of the tests V1 to V4 in accordance with the invention show that the modulus of elasticity can be set between 670 and 1130 MPa with suitable choice of the blend composition. The modulus of elasticity is reduced considerably in comparison with VB2 and VB3.

Furthermore, the notched bar impact value according to Charpy is set to >80 kJ/m$^2$ at +23° C. by the blends in accordance with the invention, which is higher than for the comparative examples VB1 to VB3. The considerably increased notched bar impact value at −30° C. in comparison with VB1 to VB3 needs to be mentioned especially.

Table 4 shows the basic data for the molding compounds of the tests V5, V6 and V7 in accordance with the invention.

TABLE 4

| Component | | Conditions | Unit | V5 | V6 | V7 |
|---|---|---|---|---|---|---|
| A | PA 610 | | | 31.2 | 31.2 | |
| A | PA 612 | | | | | 31.2 |
| B | PA MACMI/MACMT12 | | | 15.0 | 22.5 | 15.0 |
| C | PA 6 | | | 12.0 | | 7.5 |
| D | Polyamide elastomer | | | 27.5 | 27.5 | 27.5 |
| E | Non-polyamide elastomer | | | 13.0 | 17.5 | 17.5 |
| | Master batch for black coloring and heat stabilization | | | 1.3 | 1.3 | 1.3 |
| Total | | | | 100 | 100 | 100 |
| H$_2$O content | | | % b. wt. | 0.02 | 0.026 | 0.021 |
| Melting point | | | °C. | 220 | 219 | 213 |
| Modulus of elasticity | | 1 mm/min | MPa | 1250 | 1020 | 1040 |
| Load at 50% elongation | | 50 mm/min | MPa | 35 | 32 | 31 |
| Impact Charpy | | −30° C. | kJ/m$^2$ | N/B | N/B | N/B |
| Notched bar Charpy | | +23° C. | kJ/m$^2$ | 79 | 75 | N/B |
| Notched bar Charpy | | −30° C. | kJ/m$^2$ | 17 | 20 | 19 |

The abbreviations mean the following: N/B = no breakage

The data of the molding compounds for the tests V5 to V7 in accordance with the invention show that the modulus of elasticity can be set between 1020 MPa and 1250 MPa with suitable choice of the blend composition. The modulus of elasticity is reduced considerably in comparison with VB2 and VB3.

The blends in accordance with the invention set the Charpy notched bar impact value to >75 kJ/m$^2$ at +23° C., which is higher than for VB1 to VB3. The considerably increased Char notched bar impact value at −30° C. needs to be pointed out in particular.

Tables 5 and 6 show the basic data for the alternative molding compounds of the tests V8, V9, V10, V11, V12 and V13 in accordance with the invention.

TABLE 5

| Component | | Conditions | Unit | V8 | V9 | V10 |
|---|---|---|---|---|---|---|
| A | PA 610 | | | 63.7 | 63.7 | 63.7 |
| B | PA MACMI/MACMT12 | | | 10.0 | 7.5 | 7.5 |

TABLE 5-continued

| | Component | Conditions | Unit | V8 | V9 | V10 |
|---|---|---|---|---|---|---|
| C | PA 6 | | | 5.0 | 7.5 | 7.5 |
| D | Polyamide elastomer | | | 15.0 | 2.5 | 5.0 |
| E | Non-polyamide elastomer | | | 5.0 | 17.5 | 15.0 |
| | Master batch for black coloring and heat stabilization | | | 1.3 | 1.3 | 1.3 |
| | Total | | | 100 | 100 | 100 |
| | H₂O content | | % b. wt. | — | — | 0.036 |
| | Melting point | | °C. | 221.8 | 221.8 | 221.8 |
| | Modulus of elasticity | 1 mm/min | MPa | 1940 | 1620 | 1668 |
| | Load at 50% elongation | 50 mm/min | MPa | — | 40.3 | 39.4 |
| | Notched bar Charpy | +23° C. | kJ/m² | 12.92 | 75.17 | 71.39 |
| | Notched bar Charpy | −30° C. | kJ/m² | 8.75 | 18.29 | 15.6 |

TABLE 6

| | Component | Conditions | Unit | V11 | V12 | V13 |
|---|---|---|---|---|---|---|
| A | PA 610 | | | 63.7 | 63.7 | 63.7 |
| B | PA MACMI/MACMT12 | | | 5.0 | 5.0 | 7.5 |
| C | PA 6 | | | 10.0 | 10.0 | |
| C | PA 66 | | | | | 7.5 |
| D | Polyamide elastomer | | | 2.5 | 5.0 | 2.5 |
| E | Non-polyamide elastomer | | | 17.5 | 15.0 | 17.5 |
| | Master batch for black coloring and heat stabilization | | | 1.3 | 1.3 | 1.3 |
| | Total | | | 100 | 100 | 100 |
| | H₂O content | | % b. wt. | — | — | — |
| | Melting point | | °C. | 222.4 | 221.9 | 222.3 |
| | Modulus of elasticity | 1 mm/min | MPa | 1587 | 1664 | 1776 |
| | Load at 50% elongation | 50 mm/min | MPa | 39.7 | 40.1 | — |
| | Notched bar Charpy | +23° C. | kJ/m² | 85.93 | 74.06 | 68.46 |
| | Notched bar Charpy | −30° C. | kJ/m² | 19.79 | 15.2 | 14.86 |

The abbreviations mean the following: N/D = not determined, N/B = no breakage

Notice shall be taken that the polyamide PA MACMI/MACMT/12 as mentioned in Tables 2 to 6 is also known under the name Grilamid® TR 60 (EMS-CHEMIE AG).

The data of the molding compounds for the tests V8 to V13 in accordance with the invention show that the modulus of elasticity can be set between 1587 MPa and 1940 MPa with suitable choice of the blend composition. The modulus of elasticity is reduced considerably in comparison with VB2 and VB3.

The blends in accordance with the invention also set the Charpy notched bar impact value to >12 kJ/m² at +23° C., which is higher than for VB2 or VB3. The considerably increased Charpy notched bar impact value at −30° C. needs to be pointed out in the examples V9 to V13 in comparison with VB1 to VB3.

Further tests were carried out on the pipes made from these molding compounds. The respective results are summarized in Tables 7 to 10.

Table 7 shows the modulus of elasticity measured at different temperatures on ISO tension bars.

TABLE 7

| Conditions | Unit | VB1 | V1 | V2 | V3 | V4 | V5 | V6 | V7 |
|---|---|---|---|---|---|---|---|---|---|
| −40° C. | MPa | 2415 | N/D | 1500 | 1550 | 1930 | 1710 | N/D | 1585 |
| +23° C. | MPa | 670 | 670 | 740 | 1015 | 1130 | 1250 | 1020 | 1040 |
| +80° C. | MPa | 260 | 130 | N/D | 204 | N/D | N/D | N/D | N/D |
| +120° C. | MPa | 150 | 100 | N/D | 134 | N/D | N/D | N/D | N/D |
| +180° C. | MPa | 40 | 40 | 50 | 55 | 65 | 75 | 40 | 30 |
| +200° C. | MPa | N/M | N/D | N/D | 25 | N/D | N/D | N/D | N/D |

The abbreviations mean the following: N/D = not determined, N/M = not measurable since VB1 has a melting point of 198° C.

The modulus of elasticity which is reduced in comparison with VB1 at −40° C. with the same or higher modulus of elasticity at +180° C. needs to be pointed out especially.

Table 8 shows the thermal ageing of ISO tension bars by storing at +150° C. and the resulting tensile load during breakage of these ISO tension bars.

TABLE 8

| Storage time [h] | Unit | V3 | | VB1 | |
|---|---|---|---|---|---|
| 0 | MPa | 38 | 100% | 43 | 100% |
| 250 | MPa | 37 | 97% | 33 | 77% |
| 500 | MPa | 37 | 97% | 31 | 72% |
| 750 | MPa | 36 | 95% | 29 | 67% |
| 1000 | MPa | 36 | 95% | 28 | 65% |

After 1000 hours at +150° C., V3 still has a breaking tension of 97% of the initial value, whereas the breaking tension has already decreased to 65% in VB1.

Table 9 shows the thermal ageing of ISO tension bars by storing at +150° C. and the resulting extension during breakage of these ISO tension bars.

TABLE 9

| Storage time [h] | Unit | V3 | | VB1 | |
|---|---|---|---|---|---|
| 0 | % | 110 | 100% | 347 | 100% |
| 250 | % | 83 | 75% | 273 | 79% |
| 500 | % | 64 | 58% | 167 | 48% |
| 750 | % | 62 | 57% | 116 | 33% |
| 1000 | % | 56 | 51% | 86 | 25% |

After 1000 hours at +150° C., V3 still has an elongation at break of 51% of the initial value, whereas the elongation at break has already decreased in VB1 already after 500 hours to beneath 50% of the initial value.

Table 10 shows the bursting pressure according to DIN 73378 (+23° C.) in pipes with different dimensions.

TABLE 10

| Pipes 9 × 1.5 mm Bursting pressure [bar] | | | Pipes 10 × 1 mm Bursting pressure [bar] | | | Pipes 12.5 × 1.25 mm Bursting pressure [bar] | | |
|---|---|---|---|---|---|---|---|---|
| V3 | V4 | V5 | V3 | V4 | V5 | V3 | V4 | V5 |
| 90 | 90 | 104 | 51 | 53 | 56 | 47 | 51 | 53 |

The collapsing temperature of the lines was measured at a vacuum of 940 mbar during the testing of the pipes for resistance to vacuum. The tested lines which were made with the molding compound V3 in accordance with the invention with the dimensions 12.5×1.25 mm collapsed at 940 mbar vacuum and +166° C. This collapsing temperature thus lies 10° C. over that of VB1. It was thus shown that the molding compounds in accordance with the invention have a special and unexpected advantage when used as a vacuum line at a higher temperature, especially as a brake booster line of a motor vehicle.

Even though FIG. 1 only shows shearing modulus curves of molded parts which have been produced with different molding compounds, this drawing shall not limit the scope of disclosure of this patent application. Moduli of tension and elasticity were actually also measured. It was noted that molded parts which were produced with the polyamide blend molding compounds in accordance with the invention (e.g. V2) have a modulus of elasticity of not more than 1400 MPa at a temperature of −30° C. Further measurements showed that molded parts which were produced with the polyamide blend molding compounds in accordance with the invention (e.g. V2) have a modulus of elasticity of not more than 2400 MPa at a temperature of −40° C. In the case of molded parts produced with the preferred polyamide blend molding compounds (e.g. V7), the modulus of elasticity is not more than 2000 MPa at −40° C., and not more than 1950 MPa in the case of especially preferred polyamide blend molding compounds (e.g. V3).

Moduli of tension and elasticity were also measured at higher temperatures (e.g. at +120° C.) in molded parts which were produced with the polyamide blend molding compounds in accordance with the invention (e.g. V2). It was noticed that these molded parts have a modulus of elasticity of at least 180 MPa at a temperature of +120° C. In the case of molded parts produced with preferred polyamide blend molding compounds (e.g. V7), the modulus of elasticity was at least 150 MPa, and in the case of especially preferred polyamide blend molding compounds it was at least 140 MPa (e.g. V3).

A molded part, made of a polyamide blend molding compound, according to the present invention preferably is characterized in that it has a modulus of elasticity of not more than 2400 MPa, preferably not more than 2000 MPa, and especially preferably not more than 1950 MPa, at a temperature of −40° C. A molded part, made of a polyamide blend molding compound, according to the present invention preferably is characterized in that it has a modulus of elasticity of at least 50 MPa, preferably at least 75 MPa, and especially preferably at least 85 MPa, at a temperature of +180° C.

The invention claimed is:

1. A polyamide blend molding compound, comprising a polyamide blend content and at least one impact-resistant component, wherein
   the polyamide blend content comprises the following polyamides:
   (A) 25 to 50% by weight of at least one semi-crystalline polyamide with an enthalpy of fusion >40 J/g and with an average of at least 8 C atoms per monomeric unit selected from the group consisting of PA 610, PA 612, PA 1010, PA 106, PA 106/10T, PA 614 and PA 618;
   (B) 10 to 20% by weight of at least one amorphous and/or microcrystalline polyamide, with the microcrystalline polyamide having an enthalpy of fusion in the range of 4 to 40 J/g, and
   (C) 5 to 10% by weight of at least a third polyamide with an average of a maximum of 6 C atoms per monomeric unit and an enthalpy of fusion >40 J/g; and
   the impact-resistant component comprises:
   (D) 10 to 40% by weight of a polyamide elastomer comprising hard segments and soft segments, with the hard segments being based on lactams and/or aminocarboxylic acids, and (E) 0 to 35% by weight of a non-polyamide elastomer,
   and wherein the weight percent of (A)-(E), respectively, relate to the total weight of the polyamide blend molding compound.

2. The polyamide blend molding compound according to claim 1, wherein the microcrystalline polyamide of component (B) has an enthalpy of fusion in the range of 4 to 25 J/g.

3. The polyamide blend molding compound according to claim 1, wherein the polyamide elastomer of component (D) is selected from the group consisting of polyether amides, polyester ether amides and polyester amides.

4. The polyamide blend molding compound according to claim 1, wherein the at least one amorphous and/or microcrystalline polyamide of component (B) is selected from the group consisting of PA MACMI/MACMT/12; PA MACMI/12; PA PACM12; PA 6I/6T; PA TMDT; PA NDT/INDT; PA 6I/MACMI/MACMT; PA 6I/6T/MACMI; PA MACM12/PACM12; PA MACMI/MACM36; PA 6I; PA 12/PACMI; PA 12/MACMI; PA 12/MACMT; PA 6I/PACMT; PA 6/6I; PA 6/IPDT; PA MACM12; PA MACM18; PA PACM12; PA MACM12/PACM12; PA MACM18/PACM18; PA 6I /PACMI/PACMT; PA 6I/MXDI; and combinations of two or more thereof.

5. The polyamide blend molding compound according to claim 4, wherein the polyamide PA MACMI/MACMT/12 is formed by:
30 to 45 parts by weight of MACMI;
30 to 45 parts by weight of MACMT, and
10 to 40 parts by weight of LC12.

6. The polyamide blend molding compound according to claim 1, wherein the at least third polyamide of component (C) having an average of a maximum of 6 C atoms per monomeric unit is selected from the group consisting of the polyamides PA 6, PA 46 and PA 66.

7. The polyamide blend molding compound according to claim 1, wherein the polyamide blend content comprises the following polyamides:
(A) 25 to 50% by weight of PA 610;
(B) 10 to 20% by weight of PA MACMI/MACMT/12, and
(C) 5 to 10% by weight of PA 6,
and wherein the weight percent of (A), (B), and (C), respectively, relate to the total weight of the polyamide blend molding compound.

8. The polyamide blend molding compound according to claim 1, wherein the polyamide elastomer of component (D) with hard segments on the basis of lactam and/or aminocarboxylic acid is selected from the group consisting of polyether amides, polyester ether amides and polyester amides, with the polyamide elastomer comprising hard blocks made of PA 6, PA 11 or PA 12 segments.

9. The polyamide blend molding compound according to claim 1, wherein the non-polyamide elastomer of component (E) is selected from the group consisting of ethylene-α-olefin-copolymers, ethylene-$C_{3-12}$-α-olefin-copolymers and ethylene-$C_{3-12}$-α-olefin with an unconjugated diene, NBR and acrylate.

10. The polyamide blend molding compound according to claim 9, wherein the ethylene-α-olefin-copolymer is an EP elastomer and/or EPDM elastomer, with the olefin of the ethylene-$C_{3-12}$-α-olefin-copolymer being chosen from the group of propene, 1-butene, 1-pentene, 1-hexene, 1-octene, 1-decene and/or 1-dodecene, and with the unconjugated diene being chosen from the group of bicyclo(2.2.1)heptadiene, hexadiene-1.4, dicyclopentadiene and 5-ethylidene norbornene.

11. The polyamide blend molding compound according to claim 9, wherein the ethylene-α-olefin-copolymers are a mixture of ethylene-propylene- copolymer and ethylene-butylene copolymer grafted with maleic acid anhydride.

12. The polyamide blend molding compound according to claim 1, wherein a filler is admixed to the blend which is selected from the group consisting of fibers and organically modified layered silicates, with the fibers being glass fibers, with glass fibers being mixed into the polyamide blend molding compound up to 20% by weight and with the organically modified layered silicates being selected from the group consisting of mica, smektites and vermiculite, with organically modified layered silicates being mixed into the polyamide blend molding compound up to 15% by weight.

13. A method of producing a polyamide blend molding compound according to claim 1, wherein each polyamide of the components (A,B,C) of the polyamide blend content and the polyamide elastomer of the impact-resistant component (D) is produced in a classic polymerization autoclave at a total pressure which is 300 mbar or higher.

14. A molded part, made of a polyamide blend molding compound, according to claim 1, wherein the molded part has a modulus of elasticity of not more than 1400 MPa at a temperature of −30 ° C.

15. A molded part, made of a polyamide blend molding compound, according to claim 1, wherein the molded part has a modulus of elasticity of not more than 2400 MPa at a temperature of −40 ° C.

16. A molded part, made of a polyamide blend molding compound, according to claim 1, wherein the molded part has a modulus of elasticity of at least 50 MPa at a temperature of +180 ° C.

17. The molded part according to claim 14, which is a pipe which is selected from the group consisting of a line in or on a motor vehicle and a line in or on an immobile structure.

18. The line in or on a motor vehicle according to claim 17, comprising a brake booster line, a cooling-water line, an air-intake line, a heating line, a venting line, a hydraulic line, or a pneumatic brake line.

19. The line in or on an immobile structure according to claim 17, comprising a waste-water line, a rainwater line, a pneumatic-post line, a heating-oil line, a long-distance heating line, a cold-water line, a hot-water line, a drinking-water line, or a protective pipe for an electric line.

20. The molded part according to claim 14, comprising an injection-molded brake booster, fuel filter or air filter component.

21. The polyamide blend molding compound of claim 1, further comprising conventional additives.

22. The polyamide blend molding compound of claim 1, wherein (A)-(E) together with optionally added conventional additives represent 100% by weight of the polyamide blend molding compound.

23. The molded part according to claim 15, having a modulus of elasticity of not more than 2000 MPa at a temperature of −40° C.

24. The molded part according to claim 15, having a modulus of elasticity of not more than 1950 MPa at a temperature of −40 ° C.

25. The molded part according to claim 16, having a modulus of elasticity of at least 75 MPa at a temperature of +180 ° C.

26. The molded part according to claim 17, comprising a single-layer extruded pipe.

27. The single-layer extruded pipe according to claim 26, which is a vacuum brake booster line.

28. The molded part according to claim 14, having a modulus of elasticity of at least 50 MPa at a temperature of +180° C.

* * * * *